United States Patent [19]

Pourshalchi

[11] Patent Number: 4,934,317

[45] Date of Patent: Jun. 19, 1990

[54] DUMP AND REPLACE LITTER BOX

[76] Inventor: Edward M. Pourshalchi, 165 E. Broadway, Roslyn, N.Y. 11576

[21] Appl. No.: 305,754

[22] Filed: Feb. 3, 1989

[51] Int. Cl.$^5$ ............................................. A01K 29/00
[52] U.S. Cl. ....................................... 119/1; 119/56.1
[58] Field of Search .................... 119/1, 56 R, 57, 56.1

[56] References Cited

U.S. PATENT DOCUMENTS

| 3,621,817 | 11/1971 | Printz | 119/1 |
| 4,235,200 | 11/1980 | Shay | 119/56.1 |
| 4,493,288 | 1/1985 | Van der Kolk | 119/1 |
| 4,844,011 | 7/1989 | Strickland | 119/1 |

FOREIGN PATENT DOCUMENTS

| 1198638 | 12/1985 | Canada | 119/1 |
| 2384448 | 11/1978 | France | 119/1 |

Primary Examiner—John Weiss
Attorney, Agent, or Firm—Berman, Aisenberg & Platt

[57] ABSTRACT

An animal litter box, readily marketable in kit form, comprises a fresh-litter supporting bottom tray and a litter reservoir with a bottom feeding mechanism. When litter on the bottom tray is soiled, the tray is readily moved past scraping means to dump the soiled litter in a trash receptacle and simultaneously actuate the feeding mechanism to replace the removed soiled litter with fresh litter. The bottom tray has a support which is rotatable about an axis by exerting a force, foot pressure, against a biasing means which returns the bottom tray to its initial position when the force is removed.

19 Claims, 2 Drawing Sheets

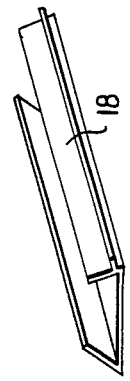
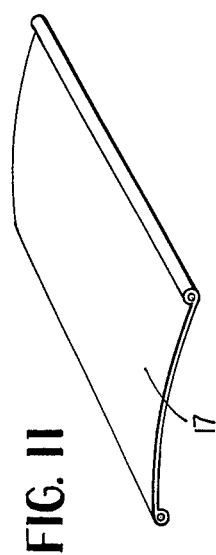
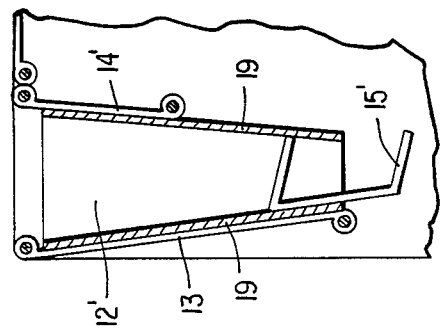
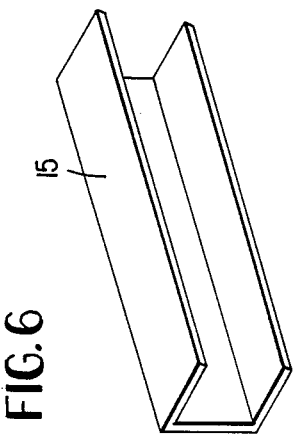
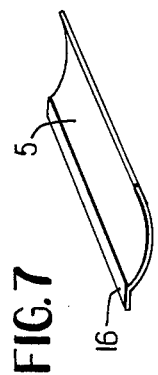
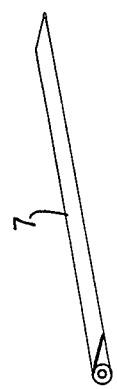
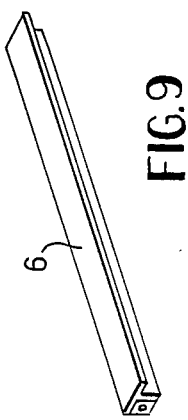
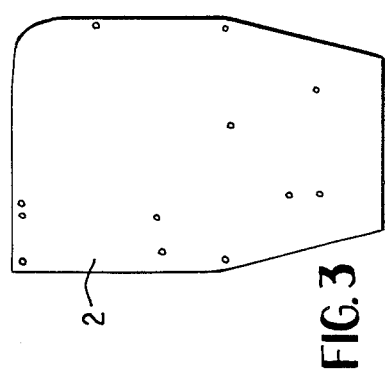
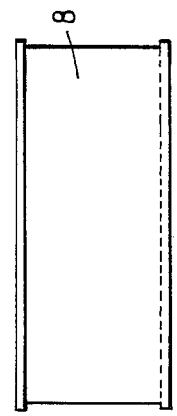
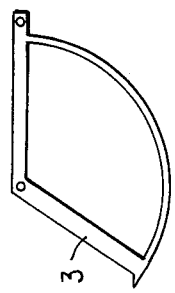

DUMP AND REPLACE LITTER BOX

FIELD OF THE INVENTION

An animal litter box is provided with means for scraping soiled litter from a bottom tray and replacing the soiled litter with fresh clean litter in a single simple operation.

BACKGROUND

Numerous types of litter boxes have been proposed. There are two predominant types; one provides a simple filtering mechanism, and the other, a fairly complex dump-and-replace mechanism. Filtering mechanisms normally work by sifting dirty litter material through a filter-like screen in order to separate hard waste refuse from the litter itself. Menzel (U.S. Pat. No. 4,190,525) is an example of such mechanisms. This approach is normally inadequate, as odor problems are due to ammonia-filled liquid waste rather than to hard waste. Removing hard waste elements from the litter simply does not solve the problem of the litter box, and forces users into a cumbersome two-step cleaning process in which hard waste is cleaned first and the litter material itself is replaced at a later time. Such systems require double work.

The dump-and-replace types clean hard and liquid waste at the same time by dumping all soiled litter into a trash receptacle. These systems usually include a "litter reservoir" that stores clean litter, an openable/closable trap-like bottom tray that holds the litter to be used by a pet, and a linable receptacle located beneath the tray to receive and hold used litter. Maness (U.S. Pat. No. 3,954,086) and Van der Kolk (U.S. Pat. No. 4,493,288) provides examples of such systems. Existing designs of the dump-and-replace approach contend with two important problems that impair their successful commercialization. They require sophisticated electronic sensors to coordinate the opening/closing of the litter reservoir with the closing/opening of the bottom tray. They also need an electrical mechanism to deal with the significant weight of the litter to be lifted and displaced. The high cost of electronics and electrical components and the potential danger accompanying the use of such components render the resulting mechanisms unfit for practical implementation.

Further examples of the development of litter boxes are provided by Printz (U.S. Pat. No. 3,621,817), Taylor (U.S. Pat. No. 3,908,597), Cotter (U.S. Pat. No. 4,096,827), Bilak (U.S. Pat. No. 4,327,667) and Mopper (U.S. Pat. No. 4,465,018).

SUMMARY OF THE INVENTION

A human powered and thus electricity-free self-cleaning dump-and-replace litter box is perfectly safe and inexpensive to manufacture. By moving a bottom tray past a scraper means, soiled litter is dumped into a trash receptacle while fresh replacement litter is dispensed onto the bottom tray.

One object of the invention is to provide a single-panel rotating bottom tray that is easily cleaned by human power alone and with a minimum amount of effort. An object is to provide a scraper that wipes the bottom tray clean prior to each introduction of fresh litter. Another object is to provide a litter box in which cleaning cycles are individually determined by the human owner. A further object is to provide a litter dispensing mechanism which is activated after soiled litter is removed from the bottom tray. A still further object is to provide means to activate dispensing of fresh litter which is coordinated with removal of soiled litter from the bottom tray. Another object of the invention is to provide all of the essential components of the self-cleaning dump-and-replace litter box in modular kit form.

These and other objects are apparent from the description which follows.

BRIEF DESCRIPTION OF THE FIGURES

FIG. 3 is a side plan view of each side panel.

FIG. 4 provides (a) a side view and (b) a front view of the front cross-panel.

FIG. 5 is a side view of each side bracket.

FIG. 6 is an isometric view of the feeding mechanism.

FIG. 7 is an isometric view of the bottom tray.

FIG. 8 is an isometric view of the scraper.

FIG. 9 is an isometric view of the lever.

FIG. 10 is an isometric view of the trash receptacle.

FIG. 11 is an isometric view of the hood panel.

FIG. 12 is a side plan view of a variant of the litter reservoir.

DETAILS

Figure 1:
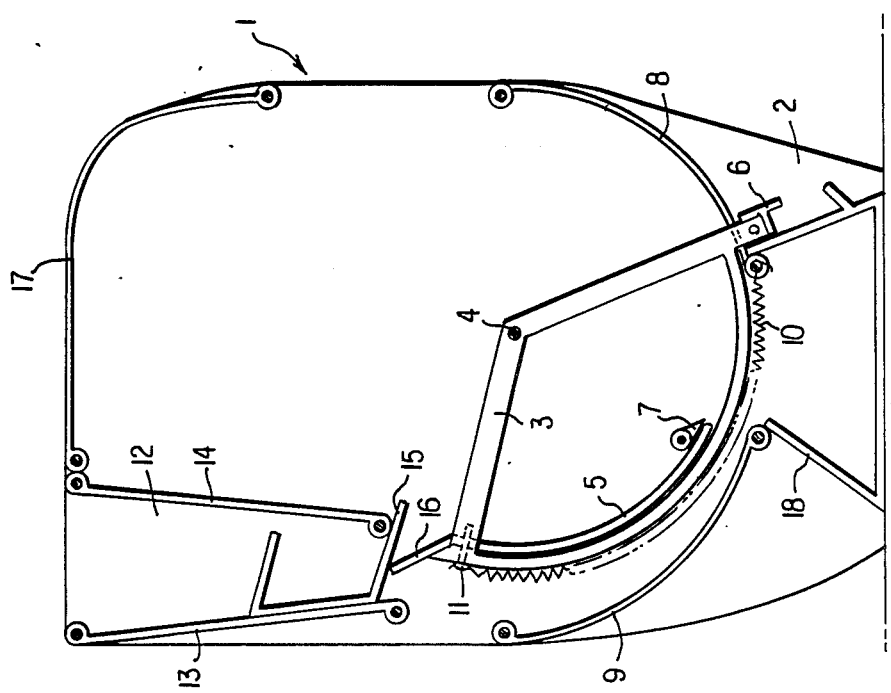
FIG. 1 is a side plan view of the litter box when the bottom tray is in normal starting position.

The litter box 1 has two identical side panels 2 (on opposite sides), which support all other components. Each of two side brackets 3 is rotatably attached to a different side panel 2 at its axis 4. A rod (axle) secured at opposite ends to the two side panels passes through axis 4. Alternatively, a rivet or other fastening means (about which the side bracket can rotate) is passed through or attached to each axis 4 and the immediately adjacent side panel 2.

The two side brackets are secured at one end to a bottom tray 5 and at the other end to a lever 6. The lever 6 is, e.g., a stepon lever operable by foot pressure. Both the bottom tray and the lever gap the entire distance between the two side brackets.

A scraper 7 extends between both side panels and is secured to each at its opposite ends. A front cross panel 8 and a back cross panel 9 also extend between and are secured to both of the side panels at their opposite ends. By securing these elements (at their opposite sides) to the side panels, considerable strength is imparted to the structure of the litter box. Both the front cross panel 8 and the back cross panel 9 are secured at their upper and lower extremities to each of the side panels.

From points adjacent each of the side panels the lower extremity of the front cross-panel is attached via biasing means 10 to a position 11 on the side bracket remote from lever 6.

A litter reservoir 12 is constructed of two cross panels 13 and 14, each of which is secured at its upper and lower extremities to both of the side panels and extends over the entire distance between the two side panels. The litter reservoir further comprises a feeding mechanism 15, which is designed to release, on demand, a predetermined amount of litter. An actuator means 16 is provided to move with the side bracket and to engage the feeding mechanism so that the predetermined amount of litter will be dispensed from the litter reservoir onto the bottom tray.

In an alternative embodiment (shown in FIG. 12) cross panel 14 is replaced by a shorter support element 14'. When this embodiment is used, an independent and replaceable litter reservoir 12' (with its own feeding mechanism 15') is supported by cross panel 13 on one side and by support 14' on the other. This independent litter reservoir has side walls 19 and is operated in the same way as disclosed for the permanently-installed version of the litter reservoir. In this embodiment cross panel 13 is optionally replaced by any other suitable supporting means for the replaceable litter reservoir, and supporting element 14' is not limited to the form illustrated in FIG. 12; other suitable supporting means are readily apparent and are equally effective.

A hood 17 is optionally provided for the litter box. To receive soiled litter removed from the bottom tray by the scraper means 7, a removable trash receptacle 18 is provided beneath and between the front cross panel 8 and the back cross panel 9.

FIG. 1 shows the side bracket in normal starting (rest) position. When litter on the bottom tray becomes contaminated, pressure, such as foot pressure, can be exerted against level 6 to push the bottom tray 5 against the biasing means, such as a spring, 10 and past scraper means 7 so as to scrape the soiled litter from the upper surface of the bottom tray and thus dump it into the trash receptacle 18.

Figure 2:
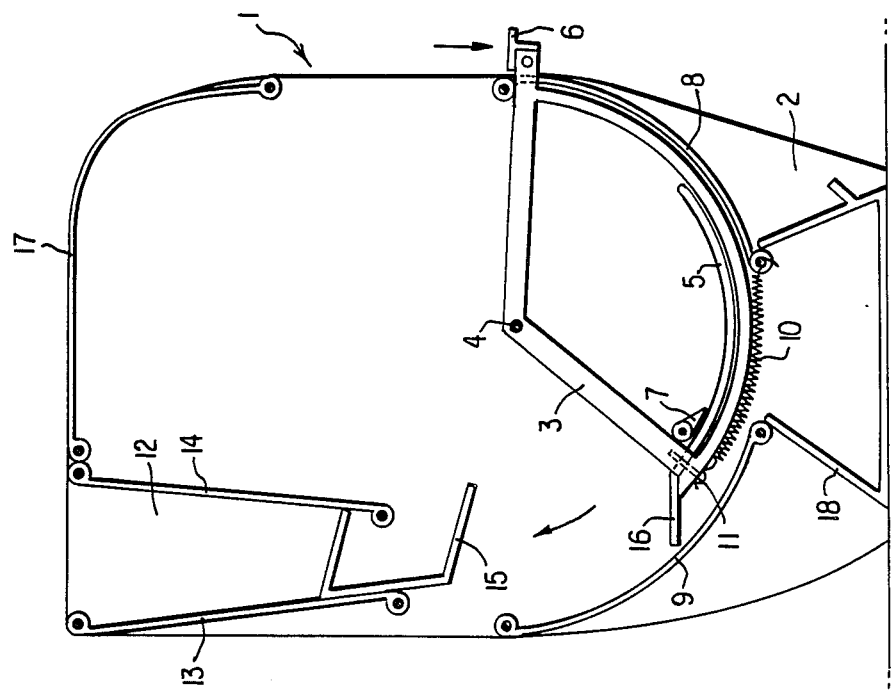
FIG. 2 is a side plan view of the litter box when the bottom tray is in a position most remote from the normal starting position.

As this operation is taking place, the actuator means 16 engages feeding mechanism 15 (as shown in FIG. 2) so that the feeding mechanism is filled with a predetermined amount of litter from the litter reservoir 12. As pressure on lever 6 is released, the bottom tray returns to the normal starting position and litter collected in the feeding mechanism is dispensed onto the bottom tray. Alternative feeding mechanisms and actuator means may be employed. The illustrated combination is simple and efficient.

The front cross panel 8 differs from the back cross panel 9 and each of the two cross panels 13 and 14 only in one respect; gaps are provided on the respective sides (adjacent the side panels 2) to allow room for the side bracket (between the extremities of the front cross panel) to pass between the front cross panel and the side panels when the lever 6 is depressed against biasing means 10. Although front cross panel 8 and back cross panel 9 appear to be of a different shape than cross panels 13 and 14, any such differences in shape are brought about by the flexibility of the material from which the respective cross panels are formed and the manner in which such cross panels are secured to the respective side panels 2. Alternatively, the cross panels are prepared from more rigid material, in which case the front cross panel 8 and the back cross panel 9 would differ significantly from cross panels 13 and 14. Making the cross panels of flexible material is preferred and facilitates production of the litter box.

Accidental movement of the bottom tray by a pet is optionally avoided in several ways. The biasing means 10 can be strong enough to preclude such occurrence, or a simple lock or latch (not shown) can be provided on the side bracket to preclude its accidental movement. Such locks or latches are conventional and, per se, do not constitute a significant part of the litter box.

Although actuating means 16 is illustrated as an extension of the bottom tray, it can be any other suitable means and need not even be attached to the bottom tray. In optional variations the side brackets are integral with the bottom tray 5 and/or lever 6 and/or actuating means 16.

The litter box is advantageously marketed in kit form. The basic kit comprises two side brackets 3, a bottom tray 5, means for securing the bottom tray to the side brackets, biasing means 10 for the side brackets, four cross panels (8, 9, 13 and 14), two side panels 2, a feeding mechanism 15, scraper means 7 and suitable means to secure the respective elements in place and/or to the side panels. One of the four cross panels differs from the other three by having lateral gaps on opposite sides to permit room for an extension on the side bracket to pass between the front cross panel 8 and the side panel immediately adjacent thereto. Further components of the litter box kit optionally include a removable trash receptacle 18, a hood 17, lever means 6 (for attachment to the extension on the side bracket which passes between the front cross panel 8 and the adjacent side panel 2), and feeding mechanism actuator means 16.

Although the several components are readily made of any of numerous and readily apparent materials, the four cross panels, two side panels, hood and trash receptacle are preferably made of transparent plastic. The side brackets, bottom tray, feeding mechanism and feeding mechanism actuating means are also advantageously prepared from transparent plastic materials.

The invention and its advantages are readily understood from the foregoing description. Various changes may be made in the process, in the individual elements, in the litter box and in the kit without departing from the spirit and scope of the invention or sacrificing its material advantages. The products, the individual elements, the litter box and the kit hereinbefore described are merely illustrative of preferred embodiments of the invention.

What is claimed is:

1. A litter box having a bottom tray with a concave surface, a central axis, means to rotate the bottom tray to a limited extent about the central axis from a normal starting position, scraper means located above the concave surface to clean the bottom tray when the latter is rotated about said central axis, litter holding means, and means to release a predetermined amount of litter from the litter holding means onto the concave surface of said bottom tray.

2. A litter box according to claim 1 which has a receptacle for receiving residue removed from the bottom tray by the scraper means when said bottom tray is rotated.

3. A litter box according to claim 1 wherein the litter holding means has a feeding mechanism, and actuation means for the feeding mechanism are attached to the bottom tray.

4. A litter box according to claim 1 which has a hood.

5. A litter box according to claim 1 which further comprises two side panels, a front cross panel, a back cross panel and a hood, the two side panels being supported by and attached to opposite ends of the front cross panel, the rear cross panel, the hood and the litter holding means.

6. A litter box according to claim 5 which has a receptacle for receiving residue removed from the bottom tray by the scraper means when said bottom tray is rotated.

7. A litter box according to claim 6 wherein the litter holding means has a feeding mechanism, and actuation means for the feeding mechanism are attached to the bottom tray.

8. A litter box having a bottom tray, a central axis, means to rotate the bottom tray to a limited extent about the central axis from a normal starting position, biasing means to return the bottom tray to the normal starting position from any other position, scraper means to clean the bottom tray when the latter is rotated about said central axis, litter holding means, and means to release a predetermined amount of litter from the litter holding means to said bottom tray.

9. A litter box according to claim 8 in combination with a removable means for collecting residue scraped by the scraper means when the bottom tray is rotated.

10. A litter box according to claim 9 where the means to release a predetermined amount of litter comprises a combination of a feeding mechanism which is part of the litter holding means and a feeding mechanism actuator means which is attached to the bottom tray.

11. A litter box kit comprising two side brackets, a bottom tray which is securable to or integral with the two side brackets, spring biasing means for the side brackets, four cross panels, two side panels, a feeding mechanism and scraper means.

12. A litter box kit according to claim 11 which further comprises a trash receptacle.

13. A litter box kit according to claim 11 which further comprises a hood and lever means for rotating the side brackets.

14. A litter box kit according to claim 11 which has means for actuating the feeding mechanism.

15. A litter box kit according to claim 14 wherein the means for actuating the feeding mechanism is secured to the side brackets.

16. A litter box kit comprising two side brackets, a bottom tray which is securable to or integral with the two side brackets, spring biasing means for the side brackets, two cross panels, two side panels, means to support an independent litter reservoir, and scraper means.

17. A process which comprises:
rotating a litter-holding bottom tray, having a concave surface, from a normal starting position past stationary scraper means,
collecting litter, thus removed from the concave surface of the bottom tray, in a trash receptacle,
actuating a litter dispensing mechanism to release a predetermined amount of litter onto the concave surface of the bottom tray, and
returning said bottom tray to the normal starting position.

18. A process according to claim 17 wherein rotating the bottom tray is effected by applying a force against a spring biasing means which returns said bottom tray to the normal starting position when the force is removed.

19. A process according to claim 17 wherein means attached to the bottom tray actuates the litter dispensing mechanism when said tray is remote from the normal starting position.

* * * * *